Patented Feb. 12, 1924.

1,483,368

UNITED STATES PATENT OFFICE.

VAIKUNTH P. MEHTA, OF NEW YORK, N. Y., ASSIGNOR TO DHANPAT RAI, OF NEW YORK, N. Y.

MANUFACTURE OF RESINS.

No Drawing.      Application filed June 12, 1923. Serial No. 644,945.

*To all whom it may concern:*

Be it known that I, VAIKUNTH P. MEHTA, a subject of the King of England, residing at New York city, in the county of New York, State of New York, have invented certain new and useful Improvements in the Manufacture of Resins; and I do hereby declare the following to be a full, clear, and exact description of the invention, such as will enable others skilled in the art to which it appertains to make and use the same.

This invention relates to improvements in the manufacture of resinous products from phenol, formaldehyde and other ingredients.

In carrying out the invention I take phenol and formaldehyde in approximately molecular proportions, together with potassium hydroxide and ammonia, and also glycerine, and heat these materials under a high vacuum until the mixture changes into an oily liquid, after which I pour it into moulds and continue the treatment until a solidified product is obtained, after which the solidified product is heated to a high temperature to complete the process.

The phenol which I use may be the crystalline phenol of commerce, although homologues such as cresol can be used. The formaldehyde may be used in the form of the ordinary 40% solution known as formalin. Caustic soda can be used instead of caustic potash, but I consider caustic potash more advantageous as it enables the reaction to be more easily regulated. The phenol and formaldehyde are used in approximately molecular proportions. The amount of caustic potash can be widely varied, for example, from an amount equivalent to about one-fourth the molecular equivalent of the phenol to an amount which is an exceedingly small fractional proportion. The ammonia is used only in small amount. The glycerine is used in amounts varying from about 1% to about 10% of the mixture.

The invention will be further illustrated by the following specific description, but it is intended and will be understood that the invention is illustrated thereby but is not limited thereto.

The molecular proportions of phenol and formaldehyde are taken and there is added potassium hydroxide and ammonia in amounts equivalent to about 0.1083 parts of potassium hydroxide and one part of ammonia to 65 parts by weight of phenol. Glycerine is added in amount from 2 to 10% of the mixture. The mixture is put into rectangular pans and heated under a vacuum corresponding to about 29.5 or 30" of mercury at a temperature between 110° C. and 120° C., for example, by using steam under pressure as the heating means. The heat is continued until the mixture has changed into an oily liquid, say about six hours, after which the liquid is filtered and poured into molds and the heating continued under a similar high vacuum, for example, about 1 hour, after which the vacuum is reduced to from 1 to 15" and the heating continued for a further period, for example, of 2 hours until the product solidifies.

The solidified product is then heated to about 150° C. to give the final product.

I find the use of a proper amount of glycerine is important in giving the desired product. In general, the amount of glycerine added should be from 1 to 10% of the mixture. Less than 1% tends to give an opaque product while with about 1% the product may be translucent but not clear and transparent. With 2 or 3% or more and up to about 10% clear products are readily obtained. More than 10% of glycerine tends to make the product hygroscopic. While I do not wish to limit myself by any explanation of the action of the glycerine yet I believe it acts to combine with small amounts of water and perhaps with other ingredients to hold them in a combined form in the product. Most of the water is removed during the heating under vacuum. At first the removal of water takes place rapidly but after about 6 hours in the process of the above example, only slow formation of bubbles takes place. The function of glycerine appears to be to take care of the small amounts of water that are not removed by the vacuum and accordingly I use a sufficient amount of glycerine to give a clear product without using such an excessive amount as to make the product hygroscopic.

Most of the ammonia used is given off during the subjection of the mixture to the action of heat and vacuum. If the ammonia is omitted a lighter colored product is obtained, having much the appearance of window glass and suitable for use for example for automobile wind shields. The use of a small amount of ammonia gives an amber color which is desirable for certain purposes. I also find it important to use a high vacuum during the preliminary portion of the process and I consider the combined use of a vacuum and glycerine important in giving a product of the desired final character and properties.

Instead of using a very small amount of caustic potash, a much larger amount can be used. For example, an amount corresponding to about 11.2 parts of potassium hydroxide to 65 parts of phenol, with the same proportion of ammonia given in the above example. With this larger amount of caustic potash the process is carried out in a similar way to that above described, the heating being continued under a high vacuum, for example, for about 4 hours, the product then being put in a mold and maintained under a high vacuum for about 1 hour and then heated for a further period either under a lower vacuum or at atmospheric pressure. The amount of glycerine may be the same as with a smaller amount of caustic potash. The yield is somewhat higher with a larger amount of caustic potash than with the amount given in the above example. The product is finished by heating it to a temperature of about 150° C to complete the final hardening, this final heating being either at atmospheric pressure or better under a vacuum.

During the course of the heating of the mixture under a vacuum considerable phenol and formaldehyde are driven off with the water. These can be recovered for further use in the process or used for other purposes, such as disinfecting material, etc.

In the carrying out of the process the temperature may advantageously be kept at around 110 to 120° C. until the product has been converted into an oily liquid and almost all of the water has been driven off. The further heating and hardening is then carried out below 100° C. either at atmospheric pressure or under a vacuum, and such traces or small amounts of water as may remain in the product or as may be formed therein by further reaction appear to be adequately taken care of by the glycerine or glycerine compounds present in the product.

It will be evident that various shapes and sizes of molds may be used and that the product may be molded in the form of plates or sheets as well as in the form of more or less intricate castings.

The product of the present invention produced, for example, as above described, is a valuable product adapted for use for many purposes. It is soluble in concentrated sulphuric acid, giving a clear solution. It is softened and tends to crack at temperatures above about 160° C. It is specially resistant to decolorizing by sunlight, sunlight having practically no effect on the final product. Its specific gravity is unusually low being about 1.14. The product, if left in alcohol, is penetrated by the alcohol and appears to dissolve slowly therein. The product is well adapted for use for cigar and cigarette holders, and various other purposes where a light colored or amber clear or transparent material is desired. The product is characterized by containing an appreciable amount of glycerine, in a free or combined state such that the product is clear or transparent but not hygroscopic.

Variations and modifications can be made in the specific process and product without departing from the spirit and scope of the invention. For example, products made with a relatively large amount of caustic potash, say from $\frac{1}{4}$ to $\frac{1}{8}$th the molecular proportion of the phenol, give products which can be worked better on machines, lathes, etc., and products which are more tenacious and stronger than when a very small amount of caustic potash is used.

In the accompanying claims I use the term "high vacuum" as meaning a vacuum sufficiently high to promote an effective removal of water from the reaction mixture as exemplified by a vacuum corresponding to about 29.5 or 30 inches of mercury.

I claim:

1. The method of making a resinous product which comprises heating a reaction mixture containing phenol, formaldehyde, caustic alkali and glycerine under a high vacuum.

2. The method of making a resinous product which comprises heating a reaction mixture containing phenol and formaldehyde in approximately molecular proportions, potassium hydroxide and ammonia, and glycerin from 1 to 10% of the mixture, under a high vacuum.

3. The method of making a resinous product which comprises heating a reaction mixture containing phenol, formaldehyde, caustic alkali, ammonia and glycerin to a temperature of around 110 to 120° C. under a high vacuum.

4. The method of making a resinous product which comprises heating a reaction mixture containing phenol, formaldehyde, caustic alkali, ammonia and glycerin under a vacuum to a temperature above the boiling point of water, until an oily liquid is produced, pouring the liquid into molds, and further heating the material in the molds.

5. The method of making a resinous product which comprises heating a reaction mixture containing phenol and formaldehyde in about molecular proportions, potassium hydroxide and ammonia in proportions of about 1 part of ammonia to 65 grams of phenol and from 0.1083 parts to 11.2 parts caustic potash to 65 parts of phenol, and glycerin from 1 to 10% of the mixture, under a vacuum until an oily liquid is produced, pouring the liquid into molds and continuing the heating under a vacuum and later under a higher pressure, and finally completing the process by heating to a high temperature.

6. The method of making a resinous product which comprises heating a mixture of phenol and formaldehyde in approximately molecular proportions, potassium hydroxide and ammonia, and glycerine from about 1 to 10% of the mixture under a high vacuum at a temperature of about 110 to 120° C. until an oily liquid is produced, pouring the liquid into molds and heating the same to form a solidified product.

7. A new resinous product comprising a reaction product of phenol, formaldehyde, alkali and glycerin, said reaction product being produced by heating under a high vacuum and being a clear transparent product containing about 1 to 10% of glycerin.

In testimony whereof I affix my signature.

VAIKUNTH P. MEHTA.